(12) United States Patent
Chung et al.

(10) Patent No.: US 9,196,015 B2
(45) Date of Patent: Nov. 24, 2015

(54) IMAGE PROCESSING APPARATUS, IMAGE PROCESSING METHOD AND IMAGE DISPLAY SYSTEM

(75) Inventors: Chia-Hao Chung, Pingzhen (TW); Chung-Yi Chen, Puli Township, Nantou County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 556 days.

(21) Appl. No.: 13/572,897

(22) Filed: Aug. 13, 2012

(65) Prior Publication Data

US 2013/0051682 A1    Feb. 28, 2013

(30) Foreign Application Priority Data

Aug. 23, 2011    (TW) .............................. 100130180 A

(51) Int. Cl.
*H04N 7/12*    (2006.01)
*G06T 3/40*    (2006.01)
*H04N 19/105*    (2014.01)
*H04N 19/176*    (2014.01)
*H04N 19/154*    (2014.01)
*H04N 19/587*    (2014.01)
*H04N 7/01*    (2006.01)

(52) U.S. Cl.
CPC .............. *G06T 3/4007* (2013.01); *H04N 7/014* (2013.01); *H04N 19/105* (2014.11); *H04N 19/154* (2014.11); *H04N 19/176* (2014.11); *H04N 19/587* (2014.11); *H04N 7/0127* (2013.01)

(58) Field of Classification Search
None
See application file for complete search history.

(56) References Cited

U.S. PATENT DOCUMENTS

2005/0185715 A1*  8/2005  Karczewicz et al. .... 375/240.12
2006/0262853 A1   11/2006  Li et al.
2010/0296579 A1* 11/2010  Panchal et al. ........... 375/240.15

OTHER PUBLICATIONS

Taiwan Office Action dated Aug. 25, 2014, 9 pages.

* cited by examiner

*Primary Examiner* — Kate Luo
(74) *Attorney, Agent, or Firm* — Edell, Shapiro & Finnan, LLC

(57) ABSTRACT

An image processing apparatus for generating an intermediate frame according to a previous frame and a next frame is provided. The apparatus includes a determining module and a selecting module. The intermediate frame includes a plurality of intermediate image blocks, each of which corresponds to a motion vector. For each intermediate image block, the determining module determines whether an interpolated image generated according to the motion vector meets a correctness requirement. According to whether the interpolated image meets the correctness requirement, the selecting module selects the interpolated image or a substitutive image different from the interpolated image to represent the intermediate image block.

15 Claims, 5 Drawing Sheets

IMAGE PROCESSING APPARATUS, IMAGE PROCESSING METHOD AND IMAGE DISPLAY SYSTEM

This application claims the benefit of Taiwan application Serial No. 100130180, filed Aug. 23, 2011, the subject matter of which is incorporated herein by reference.

BACKGROUND OF THE INVENTION

1. Field of the Invention

The invention relates in general to an image processing technique, and more particularly to a technique for generating an interpolated image.

2. Description of the Related Art

Accompanied with the ubiquity of various electronic products, multimedia systems such as home theaters are now prevalent in households. In many multimedia systems, an important hardware component is an image display apparatus. Therefore, methods for enhancing image quality to attract consumers have long been a focus to which image display apparatus manufacturers pay much attention.

In certain applications, a frame frequency of dynamic images provided to an image display apparatus is lower than a frame update frequency of the image display apparatus itself. For example, a frame frequency of an original dynamic image is 60 Hz, whereas a frame update frequency of an image display apparatus is 120 Hz. Accordingly, the image display apparatus usually generates 60 additional frames according to the original frame being updated 60 times per second, so that a frame presented to a monitor is 120 frames per second. A most simple yet rather crude approach to achieve the 120 frames per second frame rate is to play each original frame twice. However, such approach suffers from a drawback that a viewer may sense insufficient smoothness in the frames presented. Another common approach is generating and playing an interpolated frame between two successive original frames.

In recent years, motion estimation and motion compensation techniques developed based on the concept of motion vectors have been extensively applied to image compression software/hardware. Similarly, an image display apparatus may also utilize a motion vector of two original frames to generate an interpolated image. Before generating an interpolated image according to a motion vector, the motion vector of two original frames must first be determined. In practice, an image processing apparatus may divide each frame into a plurality of blocks and estimate a motion vector of each block. Taking a block size of 8*8 pixels for example, supposing a block A1 of a frame A and a block B1 of a frame B have a same planar coordinate, the image processing apparatus compares a range of 32*32 pixels regarding the block B1 as a center to determine which 8*8 block is the most similar to the block A1, thereby identifying the motion vector between the block A1 and the block B1.

Theoretically speaking, a probability of correctly determining a motion vector becomes higher as the above comparison range gets larger. However, an image processing apparatus generally cannot define an excessively large comparison range due to limitations of an allowed calculation period. In the event that an object originally in block A1 moves exceptionally fast and its position in block B1 exceeds the comparison range, the image processing apparatus may fail to accurately identify the motion vector between blocks A1 and B1 when searching the comparison range. As another example, in the event that a photographed object changes drastically in an extremely short period resulting in an extraordinary difference between blocks A1 and B1, the image processing apparatus is also likely to misjudge the motion vector between the two blocks A1 and B1.

In sum, it is possible that a motion vector can be misjudged from time to time leading to an erroneous interpolation outcome. For example, a sky image in an interpolated image may be inappropriately presented as a tree image that obviously does not fit into surroundings. In addition, human eyes are particularly sensitive to such abrupt changes that are thus easily spotted.

In the view of the above, remedial measures for interpolation errors have been developed. In one of current approaches, an interpolated image as a new image is discarded when it is determined that a sum or all possible errors of an entire frame is higher than a threshold, and an original frame (e.g., frame A or frame B) is utilized as the new image; that is, it is in equivalence repeatedly playing the original frame. However, this approach also has a shortcoming that an image processing apparatus may be forced to give up other correct blocks with appropriate interpolation outcomes even when an entire interpolated frame only comprises a few blocks with severe errors, such that overall playback smoothness of the image is degraded due to repeatedly playing an original frame.

SUMMARY OF THE INVENTION

The invention is directed to a solution that partially utilizes a motion vector as basis for a new frame. More specifically, an image processing apparatus, an image processing method and an image display system disclosed by the present invention determine whether an interpolated image generated according to a motion vector is to be adopted in a unit of blocks. When errors due to interpolation performed on the basis of motion vectors are likely to occur at certain blocks, the image processing apparatus, image processing method and image display system disclosed by the present invention only substitute the image blocks having possible errors with image blocks that are not interpolated on basis of motion vectors.

Different from the prior art that replaces an entire new frame with an original frame, a new frame generated by the image processing apparatus of the present invention possibly contains certain image blocks that are interpolated images generated according to motion vectors while other image blocks are substitutive images that are not generated according to motion vectors. Therefore, the approach of the present invention not only is capable of reducing a probability of presenting erroneous interpolation outcomes to a viewer but also contributes more ideal playback smoothness when displaying dynamic images.

According to an aspect of the present invention, an image processing apparatus for generating an intermediate frame according to a previous frame and a next frame is provided. The intermediate frame comprises a plurality of intermediate image blocks each corresponding to a motion vector. The image processing apparatus comprises a determining module and a selecting module. For each intermediate image block, the determining module determines whether an interpolated image generated according to the motion vector meets a correctness requirement. The selecting module selects the interpolated image to represent the intermediate image block when the interpolated image meets the correctness requirement, and selects a substitutive image different from the interpolated image to represent the intermediate image block when the interpolated image block fails to meet the correctness requirement.

According to another aspect of the present invention, an image processing method for generating an intermediate frame according to a previous frame and a next frame is provided. The intermediate frame comprises a plurality of intermediate image blocks each corresponding to a motion vector. The method comprises: according to the previous frame and the next frame, determining whether an interpolated image generated according to the motion vector meets a correctness requirement; selecting the interpolated image to represent the intermediate image block when the interpolated image meets the correctness requirement, or selecting a substitutive image different from the interpolated image to represent the intermediate image block when the interpolated image block fails to meet the correctness requirement.

According to yet another aspect of the present invention, an image display system comprising a receiving module, a determining module, a selecting module and a display is provided. The receiving module receives a previous frame and a next frame. An intermediate frame comprises a plurality of intermediate image blocks each corresponding to a motion vector. According to the previous frame and the next frame, the determining module determines whether an interpolated image generated according to the motion vector meets a correctness requirement for each intermediate image block. The selecting module selects the interpolated image to represent the intermediate image block when the interpolated image meets the correctness requirement, and selects a substitutive image different from the interpolated image to represent the intermediate image block when the interpolated image block fails to meet the correctness requirement. The display sequentially displays the previous frame, the intermediate frame and the next frame.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
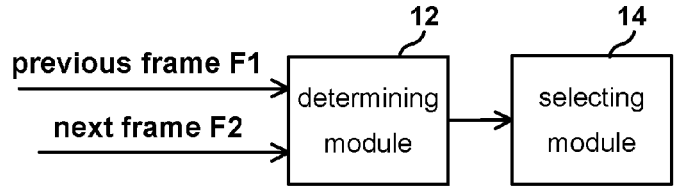
FIG. 1 is a block diagram of an image processing apparatus according to an embodiment of the present invention.

According to an embodiment of the present invention, an image processing apparatus for generating at least one intermediate frame F according to a previous frame F1 and a next frame F2 is provided. For example, the previous frame F1 and the next frame F2 may be two temporally successive frames in a video stream. As shown in FIG. 1, an image processing apparatus 100 according to the embodiment comprises a determining module 12 and a selecting module 14. In practice, the image processing apparatus 100 may be integrated in a system such as a television, a DVD player or a computer with an image playback function, or may be an independent device. The intermediate frame F comprises a plurality of intermediate image blocks, e.g., a plurality of non-overlapping image blocks of 8*8 pixels in size.

Figure 2:
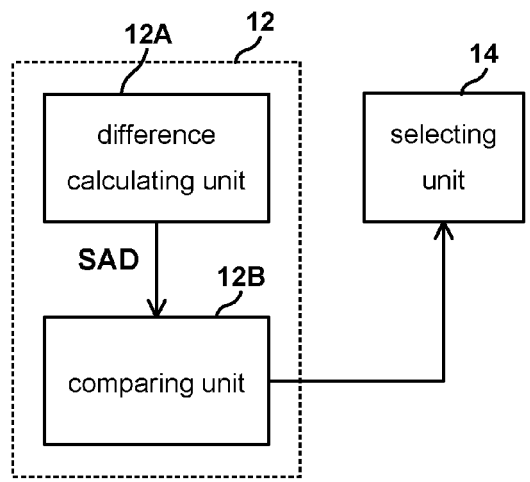
FIG. 2 is an example of a determining module according to an embodiment of the present invention.

Each intermediate image block corresponds to a motion vector, which is an unknown value at the time before any image processing is performed. According to the previous frame F1 and the next frame F2, the determining module 12 determines for each intermediate image block whether an interpolated image generated according to the motion vector meets a correctness requirement. FIG. 2 shows a determining module 12 according to an embodiment. In this embodiment, the determining module 12 comprises a difference calculating unit 12A and a comparing unit 12B. The difference calculating unit 12A calculates a minimum of a sum of absolute difference (SAD) of each intermediate image block according to the previous frame F1 and the next frame F2. Operation details of the difference calculating unit 12 shall be described below.

Figure 3:
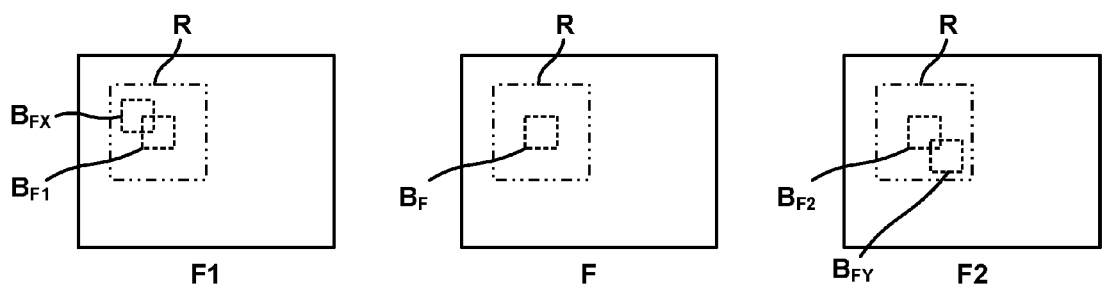
FIG. 3 is an example showing relationships of a previous frame, a next frame and an intermediate frame.

Referring to FIG. 3, suppose a planar coordinate of a center of an intermediate block $B_F$ with a size of 8*8 pixels of the intermediate frame F is (100, 100), and a range with a size of 32*32 pixels also regarding the coordinate (100, 100) as its center is defined around the intermediate image block $B_F$. As shown in FIG. 3, the range R with a same planar position is also indicated in the previous frame F1 and the next frame F2. The difference calculating unit 12A may also search for the minimum SAD of the intermediate image block $B_F$ within the range R. For example, coordinates and sizes of a previous image block $B_{F1}$ and a next image block $B_{F2}$ are the same, and thus a motion vector between the two is regarded as (0, 0). The difference calculating unit 12A may first identify the SAD of the previous image block $B_{F1}$ and the next image block $B_{F2}$. That is, the difference calculating unit 12A first identifies the SAD corresponding to the motion vector (0, 0), and then searches for the SAD corresponding to other different motion vectors within the range R.

It should be noted that the size of the image blocks is not limited to 8*8 pixels, nor is the size of the range R limited to 32*32 pixels. Further, a comparison basis utilized by the difference calculating unit 12A for calculating the SAD may be respective RGB grayscale or YUV values of the two images, but is not limited thereto.

Taking the size of the range R as 32*32 pixels for example, a range of the above motion vector is between (−15, −15) to (16, 16), so that the difference calculating unit 12A can provide a total of 1024 SADs, from which the difference calculating unit 12A then selects a minimum SAD. In this example, an image block $B_{FX}$ and an image block $B_{FY}$ are the most similar, and thus an SAD identified according to the two image blocks $B_{FX}$ and $B_{FY}$ is the minimum SAD of the intermediate image block $B_F$. In addition, a coordinate relation between the image blocks $B_{FX}$ and $B_{FY}$ may be regarded as a motion vector MV corresponding to the intermediate image block $B_F$.

When a difference between the image blocks $B_{FX}$ and $B_{FY}$ gets too large, it implies that the motion vector MV is likely faulty. Supposing an interpolated image generated according to the motion vector MV is utilized to represent the image block $B_F$, a viewer is much likely to detect that errors exist in the image block $B_F$. Therefore, the minimum SAD of the intermediate image block $B_F$ may serve as basis for determining whether an interpolated image generated according to the motion vector meets a correctness requirement. The comparing unit 12B compares the minimum SAD with a threshold, and determines the interpolated image generated according to the motion vector fails to meet the correctness requirement when the minimum SAD of the intermediate image block $B_F$ is larger than the threshold. Conversely, when the minimum SAD of the intermediate image block $B_F$ is smaller than the threshold, the comparing unit 12B determines the interpolated image generated according to the motion vector MV satisfies the correctness requirement. In practice, a value of the threshold may be determined as desired, and is not limited to a predetermined value.

With a same approach, the difference calculating unit 12A respectively identifies the minimum SAD of the intermediate image blocks. For the intermediate image blocks, the comparing unit 12B may also determine whether the interpolated image generated according to the motion vector meets the correctness requirement. It is appreciated from the above description that, instead of having to practically identify the value of the motion vector, the determining module 12 is capable of determining whether the interpolated image generated according to the motion vector meets the correctness requirement once the minimum SAD of the intermediate image block is identified.

Next, for the intermediate image block that meets the correctness requirement based on the interpolated image generated according to the motion vector, the selecting module 14 selects the interpolated image generated according to the motion vector to represent the intermediate image block. Conversely, for the intermediate image block that fails to meet the correctness requirement based on the interpolated image generated according to the motion vector, the selecting module 14 selects a substitutive image different from the interpolated image to represent the intermediate image block. Referring to the image block $B_F$ in FIG. 3, when the determining module 12 determines that the interpolated image generated according to the motion vector MV for representing the intermediate image block $B_F$ is likely faulty, the selecting module 14 does not select the interpolated image generated according to the motion vector MV to represent the image block $B_F$.

As illustrated, the image processing apparatus 100 according to an embodiment of the present invention determines whether to adopt an interpolated image generated according to a motion vector in a unit of blocks. When errors are likely to occur in certain blocks that utilize a motion vector as interpolation basis, the image processing apparatus of the present invention only replaces those image blocks but does not replace an entire intermediate frame with an original frame as in the prior art. In a final intermediate frame F according to the present invention, it is possible that certain blocks are interpolated images generated according to a motion vector while others are substitutive images different from the interpolated images generated according to a motion vector. Therefore, the approach of the present invention not only is capable of reducing a probability of presenting erroneous interpolation outcomes to a viewer but also contributes more ideal playback smoothness when displaying dynamic images.

Figure 4:
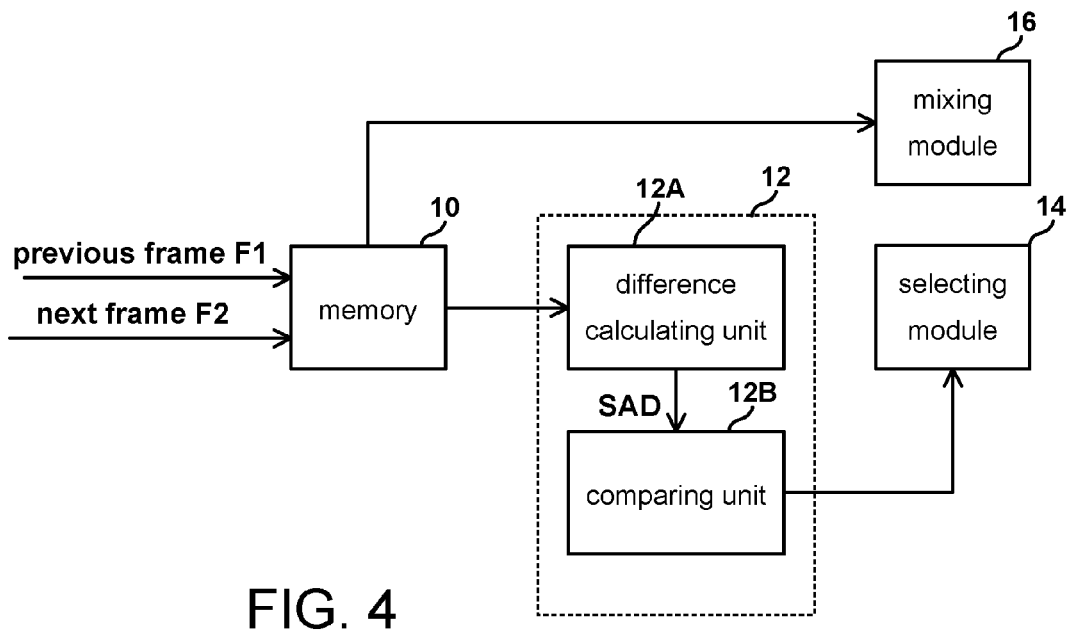
FIGS. 4 to 7 further illustrate block diagrams of hardware in the image processing apparatus for generating a substitutive image according to an embodiment of the present invention.

With reference to FIG. 4, an image processing apparatus further comprises a memory 10 and a mixing module 16 according to another embodiment of the present invention. The memory 10 receives and temporarily stores the previous frame F1 and the next frame F2, which are to be provided to a motion vector module 12 and the mixing module 16 for reference. As previously stated, each intermediate image block corresponds to a previous image block in the previous frame F1 and a next image block in the next frame F2. The mixing module 16 mixes image data of the previous image block and the next image block according to a ratio to generate a substitutive image corresponding to the intermediate image block. For example, the ratio is 50%/50%; that is, the previous image block and the next image block are averaged. Compared to an approach of directly selecting either the previous image block or the next image block as the substitutive image, the approach of the present invention further enhances image display smoothness.

Figure 5:
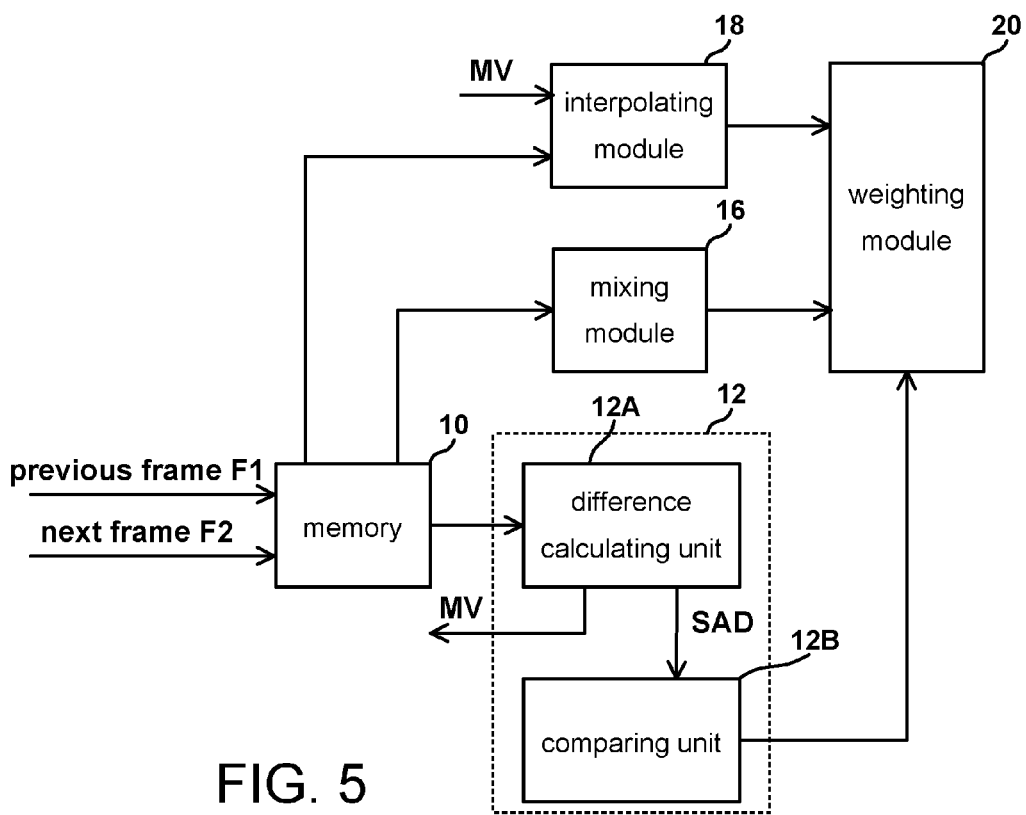

With reference to FIG. 5, an image processing apparatus comprises a mixing module 16, an interpolating module 18 and a weighting module 20 according to an embodiment of the present invention. Taking the intermediate image block $B_F$ for example, the mixing module 16 blends image data of the previous image block $B_{F1}$ and the next image block $B_{F2}$ to generate a mixed image. As previously stated, the difference calculating unit 12A also determines the motion vector MV of the intermediate image block $B_F$ when searching for the minimum SAD of the intermediate image block $B_F$. As shown in FIG. 5, the motion vector MV is provided to the interpolating module 18, which then generates an interpolated image for the intermediate frame $B_F$ according to the motion vector MV, the previous frame F1 and the next frame F2.

The weighting module 20 multiplies the image data of the mixed image by a second weighting W2 and multiplies the image data of the interpolated image by a first weighting W1, and adds up the two products to generate a substitutive image of the target image block $B_F$. A sum of the first weighting W1 and the second weighting W2 may be designed as a constant value. For example, the first weighting W1 is 0.7, and the second weighting W2 is 0.3, with a total adding up to 1. As shown in FIG. 5, functions of the selecting module 14 are realized by the weighting module 20 in this embodiment, and output signals of the comparing unit 12B are provided to the weighting module 20. More specifically, when the comparing unit 12B determines that the interpolated image generated by the interpolating module 18 according to the minimum SAD of the target image block $B_F$ fails to meet the correctness requirement, the weighting module 20 sets the second weighting W2 as 1 and the first weighting W1 as 0. Conversely, when the comparing unit 12B determines that the interpolated image generated by the interpolating module 18 according to the minimum SAD of the target image block $B_F$ meets the correctness requirement, the weighting module 20 sets the second weighting W2 as 0 and the first weighting W1 as 1. An advantage of the structure shown in FIG. 5 is that the substitutive image is a combined result of an averaged image and the interpolated image generated according to the motion vector, thus reaching a balance between pros and cons of the two images.

Figure 6:
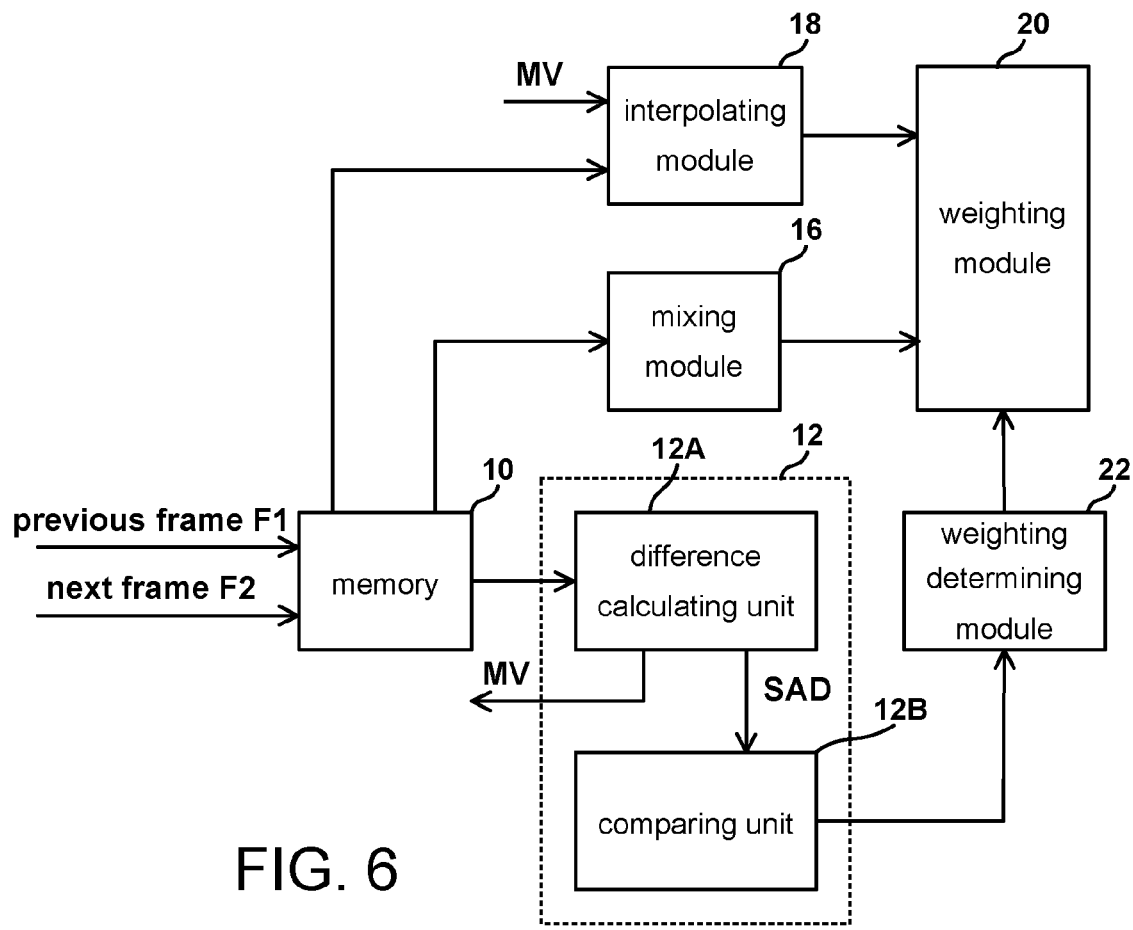

In practice, the first weighting W1 and the second weighting W2 may be designed to associate with conditions of neighboring image area of the intermediate image block. FIG. 6 shows an image processing apparatus further comprising a weighting determining module 22 according to yet another embodiment of the present invention. Apart from referencing a determination result of the comparing unit 12B, the weighting module 22 also selectively associates the weightings with neighboring image area of the intermediate image block $B_F$. Taking the intermediate image block $B_F$ for example, its neighboring image area may have a center as that of the intermediate image block $B_F$, having a range of 16*16 pixels or 32*32 pixels, for example.

Figure 7:
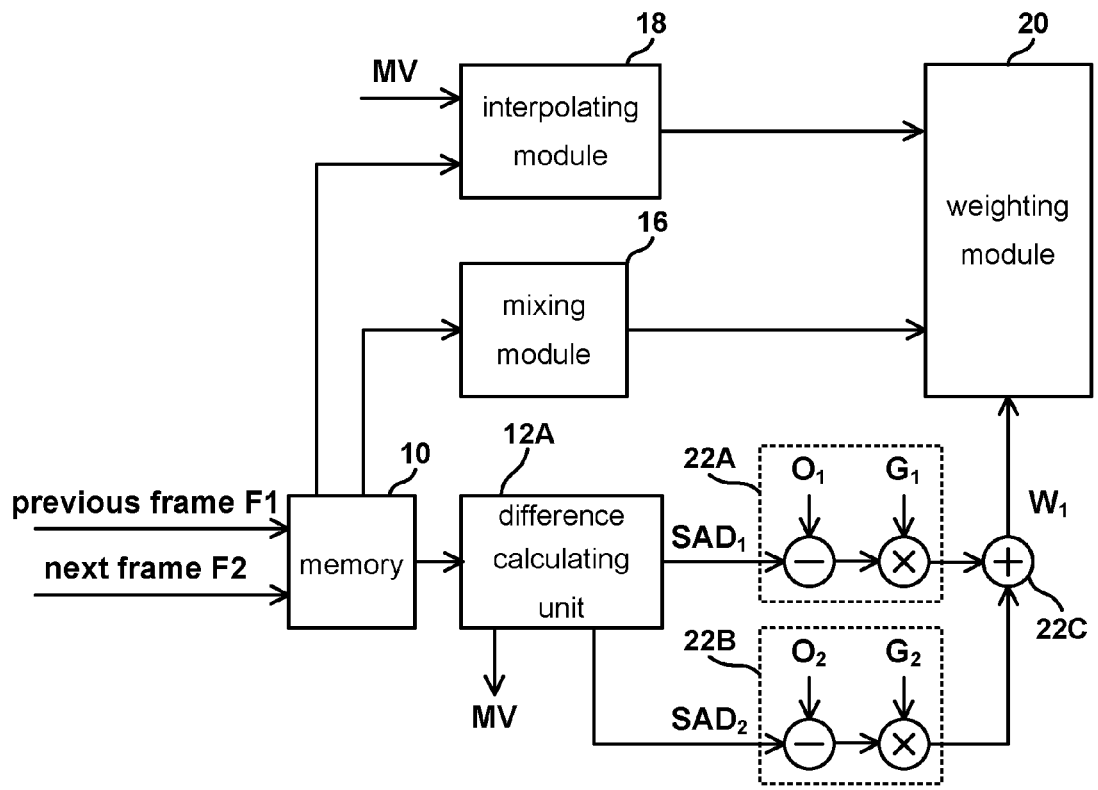

FIG. 7 shows a detailed block diagram of the weighting determining module 22. In this embodiment, the weighting determining module 22 comprises a first operation unit 22A, a second operation unit 22B and a third operation unit 22C. The neighboring image area of the intermediate image block $B_F$ is greater than and encompasses the intermediate block image $B_F$. In this embodiment, besides identifying the minimum SAD (to be referred to as $SAD_1$) of the intermediate image block $B_F$, the difference calculating unit 14A also assists in identifying the minimum SAD (to be referred to as $SAD_2$) of the neighboring image area.

In this embodiment, functions of the comparing unit 12B are realized by the first operation unit 22A. As shown in FIG. 7, the first operation unit 22A comprises a subtractor, which first subtracts a first compensation value $O_1$ from the first SAD $SAD_1$. The first compensation value $O_1$ may be designed as the threshold adopted by the comparing unit 12B in the abovementioned embodiment. An output of the subtractor is set to 0 when the first SAD $SAD_1$ is smaller than or equal to the first compensation value $O_1$. That is to say, the output of the first operation unit 22A is 0 when the first SAD $SAD_1$ is small enough to enable the corresponding interpolated image to meet the correctness requirement. Hence, the first weighting W1 is lower to corresponding reduce the weighting of the mixed image.

The first operation unit 22A further comprises a multiplier, which multiplies a difference of subtracting the first compensation value $O_1$ from the first SAD $SAD_1$ by a first gain $G_1$ to generate a first operation value. The multiplier is for adjusting a size of the difference as required, e.g., for normalizing the difference. Similarly, the second operation unit 22B also comprises a subtractor and a multiplier, for respectively subtracting a compensation value $O_2$ from the second SAD $SAD_2$ and multiplying the difference by a second gain $G_2$ to generate a second operation value. The third operation unit 22C adds the first operation value and the second operation value to generate the first weighting W1. In practice, functions of the subtractors may also be realized by the difference calculating unit 12A.

In FIG. 7, the first weighting W1 corresponding to the averaged image becomes larger as the $SAD_1$ and/or the $SAD_2$ gets larger. The $SAD_2$ of the neighboring image area reflects a change tendency of images around the intermediate image block $B_F$. Generally speaking, a probability of an unsuitable interpolated image generated according the motion vector becomes higher as the $SAD_2$ of the neighboring area gets larger. In practice, it is possible that drastic changes are present in the neighboring image area (encompassing the intermediate image block $B_F$) while the $SAD_1$ of the intermediate image block $B_F$ itself remains below the threshold (i.e., the first compensation value $O_1$). Although more accurate image changes can be reflected by selecting an intermediate image block in a smaller size, misjudgment can result in the event of the above occurrence. The structure in FIG. 7 addresses this issue.

In other embodiments, the image processing apparatus of the present invention may simultaneously consider conditions of at least two differently sized neighboring areas to provide different weightings of several differently ranged image areas, and then generate the first weighting W1 by adding up all the weighting results. For example, in an embodiment, the image processing apparatus simultaneously consider ranges with sizes of 8*8 pixels, 16*16 pixels and 32*32 pixels to first respectively generate $SAD_1$, $SAD_2$ and $SAD_3$ and then accordingly generate the first, second and third operation values. The first, second and third operation values are added to generate the first weighting W1. The first weighting W1 is forwarded to the weighting module 20 to serve as a multiplier of the interpolating module 18, and the second weighting W2 is a complementary of the first weighting W1 (i.e., 1−W1=W2). The weighting module 20 adds the product of multiplying the image data of the mixed image by the second weighting W2 and the product of multiplying the image data of the interpolated image by the first weighting W1, so as to generate the substitutive image of the target image block $B_F$.

Figure 8:
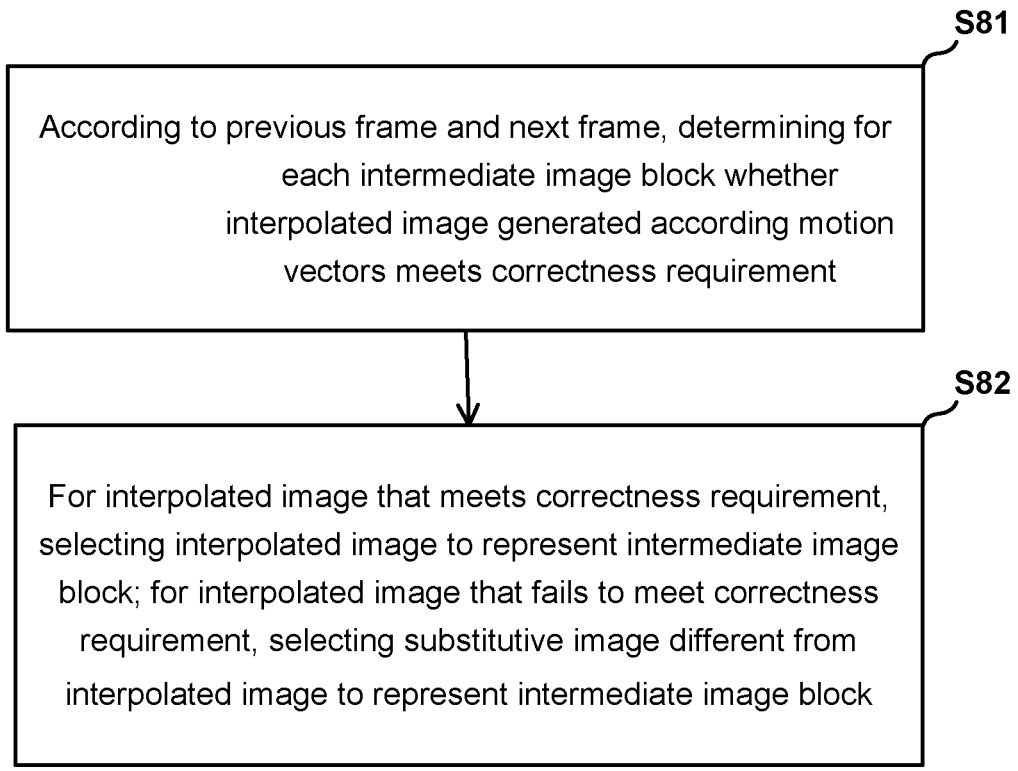
FIG. 8 is a flowchart of an image processing method according to an embodiment of the present invention.

According to another embodiment of the present invention, an image processing method for generating an intermediate frame according to a previous frame and a next frame is provided. Each intermediate frame comprises a plurality of intermediate image blocks and corresponding to a motion vector. FIG. 8 shows a flowchart of the method. In Step S81, for each intermediate image block, it is determined whether an interpolated image generated according to the motion vector meets a correctness requirement. In Step S82, the interpolated image is selected for the interpolated image that meets the correctness requirement to represent the intermediate image block, or a substitutive image different from the interpolated image is selected for the interpolated image that fails to meet the correctness requirement to represent the intermediate image block. As previous described, the substitutive image adopted in Step S82 has many other possibilities, and is not limited to the image block in the original frame. Further, approaches for determining whether the interpolated image meets the correctness requirement in Step S81 may be calculated for the minimum SAD of each intermediate image block. Associated details are as illustrated in abovementioned embodiments, and shall not be further described for brevity.

Figure 9:
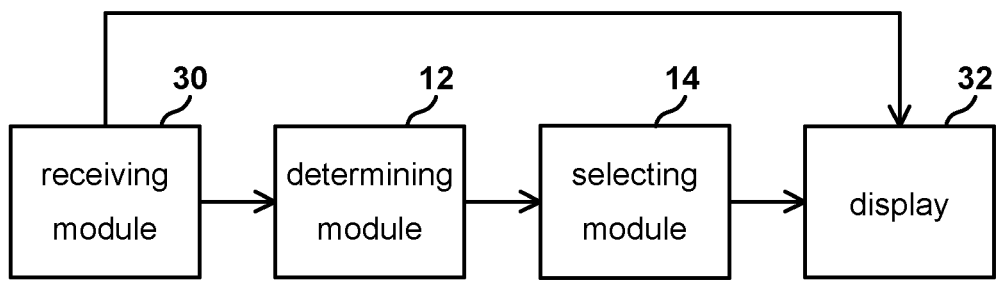
FIG. 9 is a block diagram of an image display system according to an embodiment of the present invention.

FIG. 9 shows a block diagram of an image display system according to yet another embodiment of the present invention. Apart from the determining module 12 and the selecting module 14 shown in FIG. 1, the image display system further comprises a receiving module 30 and a display 32. The receiving module 30 receives the previous frame and the next frame for generating the intermediate frame. The display 32 displays in sequence the previous frame, the intermediate frame and the next frame. In practice, the receiving module may be 30 the foregoing memory 10, but is not limited thereto. In addition, the image display system may adopt the approaches illustrated with reference to FIG. 4, FIG. 5 or FIG. 7 to generate the substitutive image. Operation details and various modifications of the modules are as illustrated in the embodiments and thus shall not be further described for brevity.

As described, the image processing apparatus, image processing method and image display system of the present invention decide whether to adopt an interpolated image generated according to a motion vector in a unit of blocks. When errors are likely to occur in certain blocks that utilize a motion vector as interpolation basis, the image processing apparatus image processing method and image display system of the present invention only replace those image blocks but do not replace an entire intermediate frame with an original frame as in the prior art. Therefore, the approach of the present invention not only is capable of reducing a probability of presenting erroneous interpolation outcomes to a viewer but also contributes more ideal playback smoothness when displaying dynamic images.

It should be noted that, the concept of present invention is not limited to generating one intermediate frame. In other words, the image processing apparatus image processing method and image display system of the present invention may also generate a plurality of intermediate frames according to a previous frame and a next frame.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing apparatus, for generating an intermediate frame according to a previous frame and a next frame, the intermediate frame comprising a plurality of intermediate image blocks each corresponding to a motion vector, the image processing apparatus comprising:
   a determining module, for determining whether each interpolated image, for each intermediate image block, generated according to the motion vectors meets a correctness requirement to generate a correctness signal;
   a selecting module, for selecting the interpolated image to represent the intermediate image block when the interpolated image meets the correctness requirement, and selecting a substitutive image different from the interpolated image to represent the intermediate image block when the interpolated image block fails to meet the correctness requirement,
   each of the intermediate image blocks corresponding to a previous image block in the previous frame and a next image block in the next frame, the image processing apparatus further comprising:
   an interpolating module, for generating the interpolated image corresponding to the intermediate image block according to the motion vector corresponding to the intermediate image block;
   a mixing module, for mixing image data of the previous image block and the next image block according to a ratio to generate a mixed image; and
   a weighting module, for adding a product of multiplying image data of the mixed image with a first weighting and a product of multiplying image data of the interpolated image by a second weighting to generate the substitutive image corresponding to the intermediate image block.

2. The image processing apparatus according to claim 1, wherein the determining module comprises:
   a difference calculating unit, for calculating a minimum sum of absolute difference (SAD) of each intermediate image block according to the previous frame and the next frame; and
   a comparing unit, for determining for the intermediate image block having the minimum SAD greater than a threshold that the interpolation image corresponding to the intermediate image block fails to meet the correctness requirement.

3. The image processing apparatus according to claim 1, wherein each of the intermediate image blocks corresponds to a previous image block in the previous frame and a next image block in the next frame, and the substitutive image corresponding to the intermediate image block is the previous image block or the next image block.

4. The image processing apparatus according to claim 1, each of the intermediate image blocks corresponding to a previous image block in the previous frame and a next image block in the next frame, the image processing apparatus further comprising:
   a mixing module, for mixing image data of the previous image block and the next image block according to a ratio to generate the substitutive image corresponding to the intermediate image block.

5. The image processing apparatus according to claim 1, the intermediate image block being located in a neighboring image area, the image processing apparatus further comprising:
   a weighting determining module, for determining the first weighting and the second weighting, wherein the second weighting is associated with the neighboring image area.

6. The image processing apparatus according to claim 5, wherein the neighboring image area encompasses and is larger than the intermediate image block, and the weighting determining module comprises:
   a difference calculating unit, for determining a first SAD of the intermediate image block and a second SAD of the neighboring image area;
   a first operation unit, for subtracting a first compensation value from the first SAD, and multiplying a corresponding difference by a first gain to generate a first operation value;
   a second operation unit, for subtracting a second compensation value from the second SAD, and multiplying a corresponding difference by a second gain to generate a second operation value; and
   a third operation unit, for adding the first operation value and the second operation value to generate the second weighting,
   wherein, the first weighting and the second weighting are complementary.

7. An image processing method, for generating an intermediate frame according to a previous frame and a next frame, the intermediate frame comprising a plurality of intermediate image blocks each corresponding to a motion vector, the method comprising:
   determining for each intermediate image block whether each interpolated image generated according to the motion vectors meets a correctness requirement according to the previous frame and the next frame; and
   selecting the interpolated image to represent the intermediate image block when the interpolated image meets the correctness requirement, or selecting a substitutive image different from the interpolated image to represent the intermediate image block when the interpolated image block fails to meet the correctness requirement wherein the substitutive image is not generated based on the motion vector,
   each of the intermediate image blocks corresponding to a previous image block in the previous frame and a next image block in the next frame, the interpolated image failing to meet the correctness requirement, the method further comprising:
   generating the interpolated image corresponding to the intermediate image block according to the motion vector corresponding to the intermediate image block;
   mixing image data of the previous image block and image data of the next image block according to a ratio to generate a mixed image; and
   adding a product of multiplying image data of the mixed image by a first weighting and a product of multiplying image data of the interpolated image by a second weighting to generate the substitutive image corresponding to the intermediate image block.

8. The method according to claim 7, wherein the determining step comprises:
   calculating a minimum SAD of each intermediate image block according to the previous frame and the next frame; and
   determining for the intermediate image block having the minimum SAD greater than a threshold that the interpolation image corresponding to the intermediate image block fails to meet the correctness requirement.

9. The method according to claim 7, wherein each of the intermediate image blocks corresponds to a previous image block in the previous frame and a next image block in the next frame, and the substitutive image corresponding to the intermediate image block is the previous image block or the next image block.

10. The method according to claim 7, each of the intermediate image blocks corresponding to a previous image block in the previous frame and a next image block in the next frame, the method further comprising:
   mixing image data of the previous image block and image data of the next image block according to a ratio to generate the substitutive image corresponding to the intermediate image block when the interpolated image fails to meet the correctness requirement.

11. The method according to claim 7, wherein the intermediate image block is located in a neighboring area, and the second weighting is associated with the neighboring image area.

12. The method according to claim 11, the neighboring image area encompassing and being greater than the intermediate image area, the method further comprising:
   determining a first SAD of the intermediate image bock and a second SAD of the neighboring image block;
   subtracting a first compensation value from the first SAD, and multiplying a corresponding difference by a first gain to generate a first operation value;
   subtracting a second compensation value from the second SAD, and multiplying a corresponding difference by a second gain to generate a second operation value; and
   adding the first operation value and the second operation value to generate the second weighting.

13. An image display system, comprising:
   a receiving module, for receiving a previous frame and a next frame;
   a determining module, for processing an intermediate frame comprising a plurality of intermediate image blocks each corresponding to a motion vector, and determining for each intermediate image block whether an interpolated image generated according to the motion vector meets a correctness requirement;
   a selecting module, for selecting the interpolated image to represent the intermediate image block when the interpolated image meets the correctness requirement, and selecting a substitutive image different from the interpolated image to represent the intermediate image block when the interpolated image block fails to meet the correctness requirement;
   a display, for sequentially displaying the previous frame, the intermediate frame and the next frame,
   each of the intermediate image blocks corresponding to a previous image block in the previous frame and a next image block in the next frame, the image display apparatus further comprising:
   an interpolating module, for generating the interpolated image corresponding to the intermediate image according to the motion vector corresponding to the intermediate image block;
   a mixing module, for mixing image data of the previous image block and image data of the next image block according to a ratio to generate a mixed image; and
   a weighting module, for adding a product of multiplying image data of the mixed image by a first weighting and a product of multiplying image data of the interpolated image by a second weighting to generate the substitutive image corresponding to the intermediate image block.

14. The image display system according to claim 13, wherein the determining module comprises:
   a difference calculating unit, for calculating a minimum SAD of each intermediate image block according to the previous frame and the next frame; and
   a comparing unit, for determining for the intermediate image block having the minimum SAD greater than a threshold that the interpolated image corresponding to the intermediate image block fails to meet the correctness requirement.

15. The image display system according to claim 13, the intermediate image block being located in a neighboring image area, the neighboring image area encompassing and being greater than the intermediate image block, the image display system further comprising:
   a weighting determining module, for determining the first weighting and the second weighting, comprising:
   a difference calculating unit, for determining a first SAD of the intermediate image block and a second SAD of the neighboring image area;
   a first operation unit, for subtracting a first compensation value from the first SAD, and multiplying a corresponding difference by a first gain to generate a first operation value;
   a second operation unit, for subtracting a second compensation value from the second SAD, and multiplying a corresponding difference by a second gain to generate a second operation value; and
   a third operation unit, for adding the first operation value and the second operation value to generate the second weighting.

* * * * *